United States Patent [19]
Frohlich

[11] 3,921,260
[45] Nov. 25, 1975

[54] COUPLING ELEMENT FOR SLIDE FASTENER
[75] Inventor: Alfons Frohlich, Essen, Germany
[73] Assignee: Opti-Holding AG, Glarus, Switzerland
[22] Filed: Apr. 9, 1973
[21] Appl. No.: 349,004

[30] Foreign Application Priority Data
Apr. 7, 1972 Germany.............................. 2216831

[52] U.S. Cl..... 24/205.13 D; 24/205.13 R; 138/121
[51] Int. Cl.² ......................................... A44B 19/14
[58] Field of Search................ 24/205.13 D; 138/121

[56] References Cited
UNITED STATES PATENTS

| 2,066,060 | 12/1936 | Sipe | 24/205.13 D |
| 2,370,613 | 3/1945 | Boenecke | 24/205.13 D |
| 2,525,284 | 10/1950 | Camp | 24/205.13 D |
| 3,050,842 | 8/1962 | Evans | 24/205.13 D |
| 3,487,574 | 1/1970 | Loof | 138/121 |
| 3,681,925 | 8/1972 | Schmunk | 138/121 |
| 3,714,311 | 1/1973 | Stefanka | 138/121 |
| 3,716,733 | 2/1973 | Keith | 138/121 |

FOREIGN PATENTS OR APPLICATIONS

| 1,071,616 | 12/1959 | Germany | 24/205.13 D |
| 851,946 | 10/1960 | United Kingdom | 24/205.13 D |

Primary Examiner—Bernard A. Gelak
Attorney, Agent, or Firm—Karl F. Ross; Herbert Dubno

[57] ABSTRACT

An extruded profile of thermoplastic material has a hollow portion with an outer channel wall which is passed, in an inflated state, between heated indented rollers to form a series of longitudinally spaced coupling heads thereon, enabling a section of the profile to be used as a slide-fastener half. Another portion of the profile, remote from its deformed channel wall, may be solid and divided into a pair of parallel longitudinal flanges attachable to a stringer tape or engageable by a lateral wing of a generally flat slider; alternatively, the entire profile may be hollow upon extrusion and may thereafter be flattened, in an area remote from the channel wall to be deformed, into a substantially solid web.

4 Claims, 9 Drawing Figures

COUPLING ELEMENT FOR SLIDE FASTENER

FIELD OF THE INVENTION

My present invention relates to an elongate coupling element from which slide-fastener halves of various lengths may be cut.

BACKGROUND OF THE INVENTION

Such coupling elements can be formed from extrudable plastic material if their coupling formations, designed to mate with complementary formations in an associated slide-fastener half, have the shape of longitudinally extending beads to be interfitted and separated by a motion perpendicular to the plane of the fastener. Such a profile has been described and illustrated in my copending application Ser. No. 348,110, filed 5 Apr. 1973.

In some instances, in which relative longitudinal shifting of the coacting fastener halves must be prevented, such profiles of constant cross-section cannot be used. This is particularly true in slide fasteners to be used in garments.

OBJECTS OF THE INVENTION

The object of my present invention is to provide a coupling element adapted to be produced in indefinite lengths by an extrusion process but provided with longitudinally spaced coupling heads designed to afford the necessary stability against both relative longitudinal shifting and transverse separation of the interlinked fastener halves made therefrom.

SUMMARY OF THE INVENTION

A coupling element according to my invention, adapted to be cut up into slide-fastener halves of a desired length, comprises an elongate seamless body of thermoplastic material provided with hollow re-entrant deformations longitudinally spaced along one of its edges, this edge being defined by a wall of a throughgoing longitudinal channel. Except for these spaced-apart deformations, referred to hereinafter as coupling heads, the body is of essentially constant cross-section throughout its length.

In order to make such an element from a continuously extruded and at least partly hollow body, I apply heat and pressure to selected locations of its aforementioned channel wall to form the longitudinally spaced coupling heads according to this invention. I have found that these coupling heads can be readily formed if the body is inflated by a high-pressure fluid admitted to its channel as it passes between two counterrotating, peripherally indented rollers; thus, the deformation step has some of the aspects of a blow-molding operation. This technique enables the molding even of relatively complex coupling formations such as two parallel rows of relatively offset coupling heads projecting from the same edge.

For structural stability, it is desirable to limit the hollow portion traversed by the inflation channel to the immediate vicinity of the deformed edge carrying the coupling heads; the remainder of the body profile may then be solid and, for example, may form a pair of substantially parallel flanges designed for attaching the fastener half to a stringer tape, or possibly to a strip of fabric or other sheet material forming part of the article (e.g. garment) to be equipped with a fastener; alternatively, as disclosed in my above-identified application Ser. No. 348,110, these flanges may bracket respective wings of a generally plate-shaped slider associated with the fastener. However, it is also possible to start with a channel occupying a major part of the body, as in a prismatic tube, and thereafter to flatten the part of the tube remote from the deformed edge into a web attachable to a supporting tape, piece of fabric or the like. The web (or the flanges) could have textile material imbedded therein to facilitate stitching thereof onto a fabric; the rollers used to flatten the hollow profile may also be suitably embossed to impart to the web a fabric-like texture simplifying the stitching operation.

If desired, the ends of the inflation channel may be thermally sealed upon the cutting of the fastener half from the deformed profile.

BRIEF DESCRIPTION OF THE DRAWING

The above and other features of my invention will now be described in detail with reference to the accompanying drawing in which.

SPECIFIC DESCRIPTION

Figure 2:
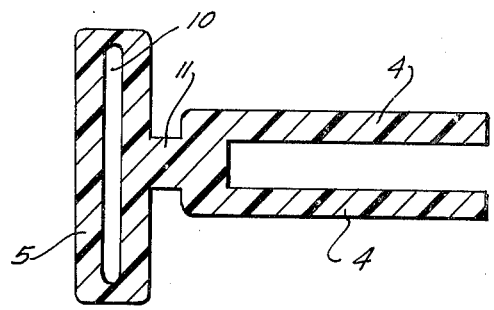
FIG. 2 is a cross sectional view taken on the line II — II of FIG. 1.
Figure 1:
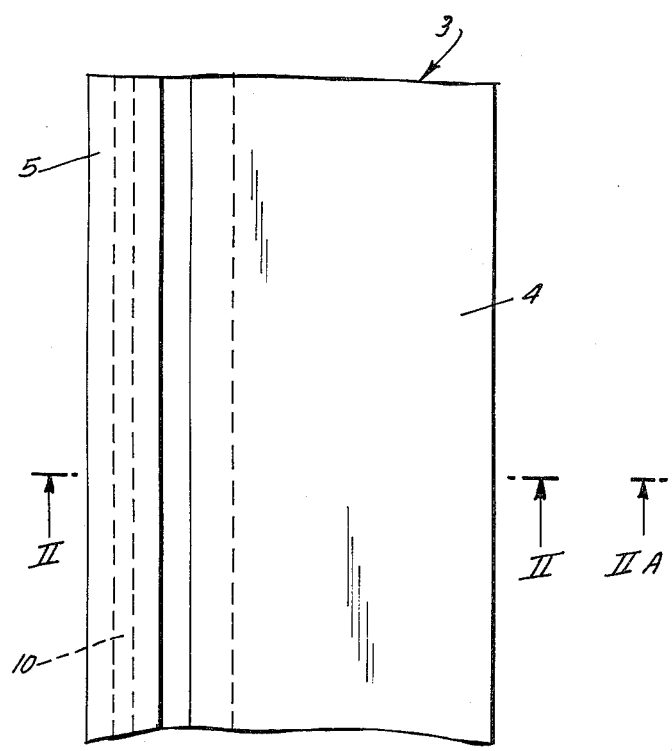
FIG. 1 is a plan view of an extruded profile to be formed into a coupling element according ty my invention.
Figure 7:
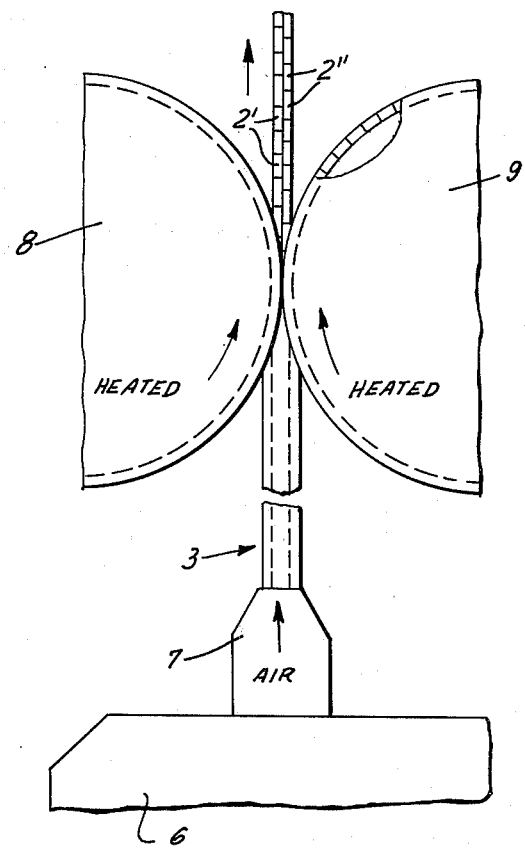
FIG. 7 is a somewhat diagrammatic plan view of an apparatus used for producing the coupling elements of FIGS. 3 – 6.

In FIGS. 1 and 2 I have shown an extruded and therefore seamless profile 3 of thermoplastic material, e.g. polyamide, as it issues from the nozzle 7 of a screw-type extruder 6 (FIG. 7). This profile has a hollow portion 5, formed with a throughgoing longitudinal channel 10, and a solid portion 4 of bifurcate cross-section separated from portion 5 by a reduced neck 11.

After extrusion, the outer wall of channel 10 is softened upon being fed into the nip of a pair of counterrotating heated rollers 8 and 9 (FIG. 7) whose indented peripheries deform the hollow portion 5 to provide it with a multiplicity of hollow undercut formations in the shape of two rows of mutually offset coupling heads 2' and 2'' spaced along the longitudinal body edge defined by the channel wall. During this process, air or some other fluid at high pressure is admitted into the channel 10 as indicated by arrows in FIGS. 3 and 7; although the channel is open at its other end, the elevated flow resistance downstream of rollers 8 and 9 inflates the hollow portion 5 sufficiently to mold it into heads 2' and 2'' conforming to the peripheral indentations of the rollers. The subsequent rigidification of the deformed channel wall may be assisted by the cooling effect of the air stream.

Figure 4:
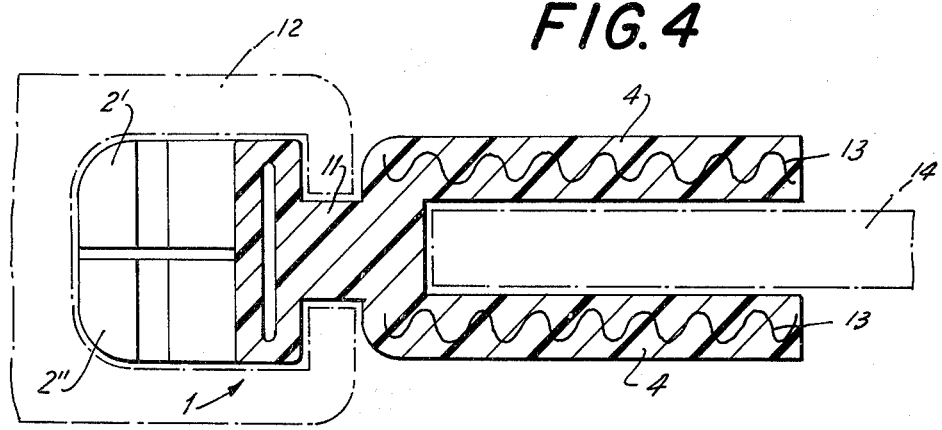
FIGS. 4 and 5 are cross-sectional views respectively taken on lines IV — IV and V — V of FIG. 3.

The coupling heads 2' and 2'' of the resulting element 1 can be interlinked with similar heads on a confronting coupling element if the two coupling elements, or shorter slide-fastener halves cut therefrom, are engaged by a conventional slider as indicated diagramatically at 12 in FIG. 4. Flanges 4, which in that case advantageously have textile inlays 13, can be stitched onto a stringer tape 14 as also diagrammatically illustrated in that Figure. On the other hand, as diagrammatically illustrated in FIG. 5, the flanges 4 may bracket a flat wing of a generally plate-shaped slider 15 of the type disclosed in my above-identified prior application. In that instance it will be convenient to secure the coupling element 1 to a stringer tape or fabric strip by means of stitching 16 passing through the reducing neck 11.

Figure 2A:
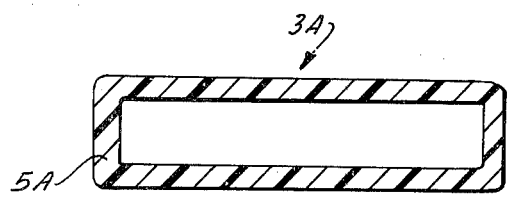
FIG. 2A is a cross-sectional view taken on the line IIA — IIA of FIG. 1A.
Figure 1A:
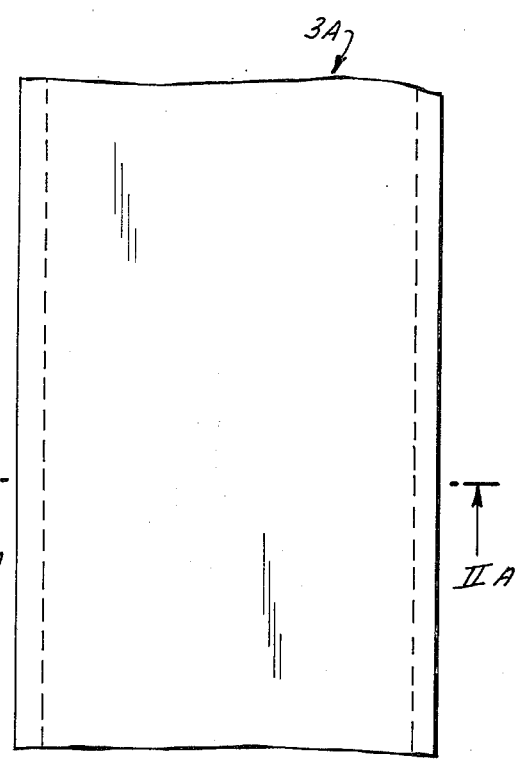
FIG. 1A is a view similar to FIG. 1, illustrating a modified profile.
Figure 6:
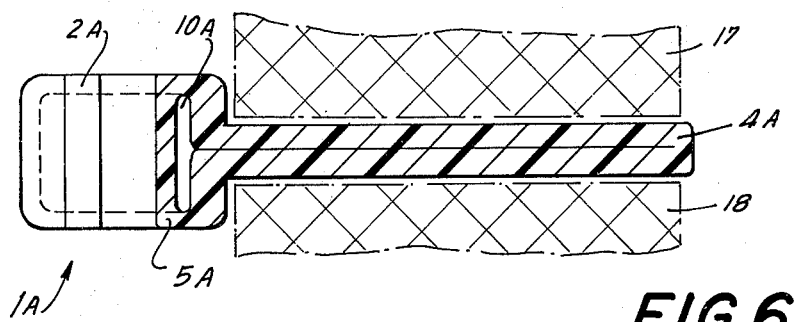
FIG. 6 is a cross-sectional view similar to FIG. 5 but relating to a coupling element obtained from the profile of FIGS. 1A and 2A.

If the extruder profile is of prismatically tubular shape as shown at 3A in FIGS. 1A and 2A, the deformation of its channel wall 5A by the apparatus of FIG. 7 produces a coupling element 1A with a set of hollow teeth 2A, FIG. 6, whose interior communicates with a channel 10A remaining after a portion 4A of the profile has been flattened into a substantially solid web. This flattening operation, performed by a pair of rollers 17 and 17 heated to fuse the juxtaposed channel walls to each other, may take place before or after the formation of the heads 2; if it is done ahead of the molding station 8, 9 of FIG. 7, the amount of air pressure required to inflate the hollow portion 5A is substantially reduced.

Figure 3:
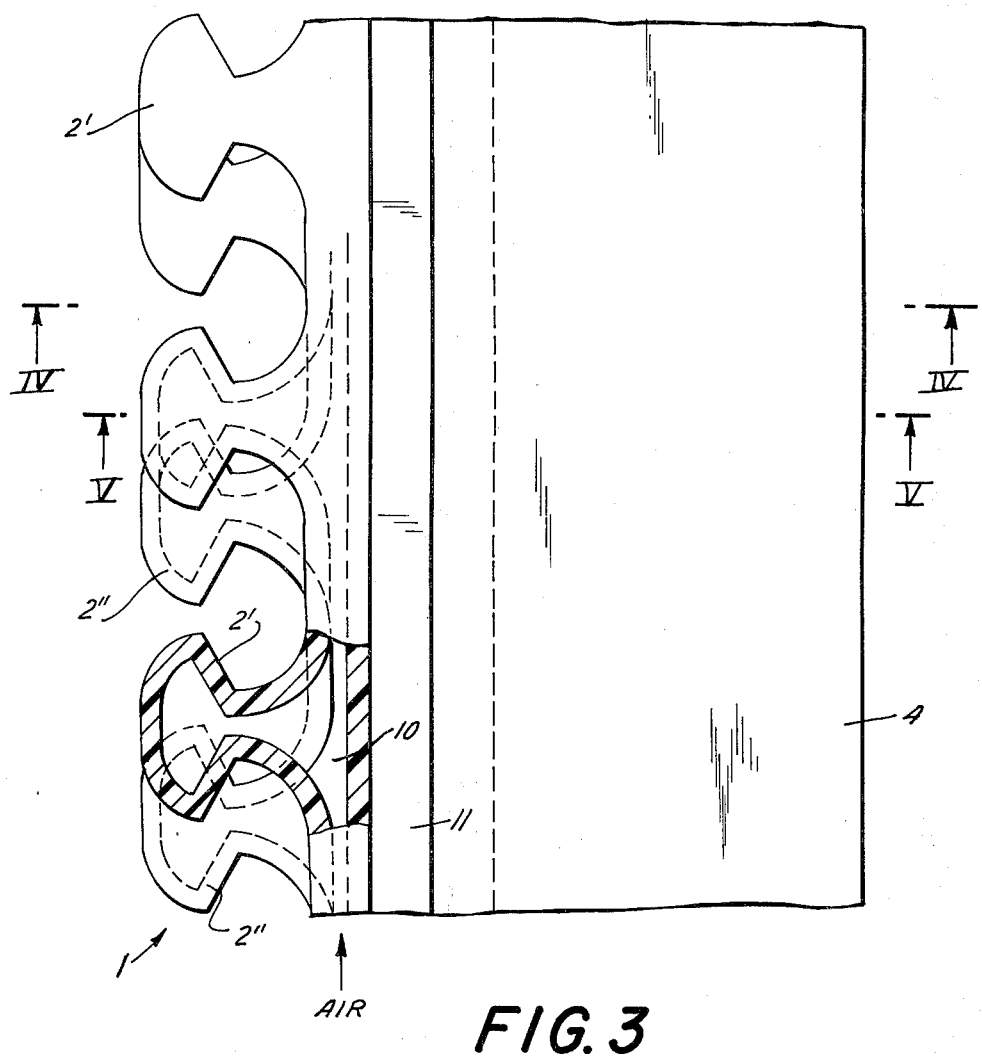
FIG. 3 is a view similar to FIGS. 1 and 1A, showing a finished coupling element obtained from the profile of FIGS. 1 and 2.
Figure 5:
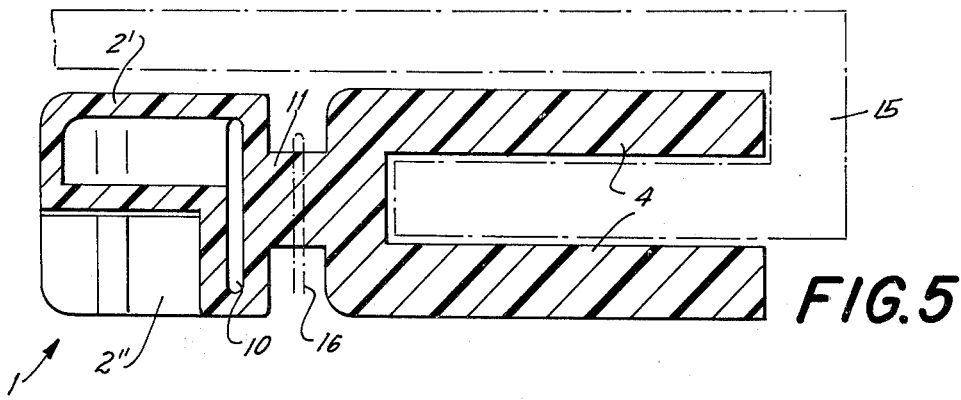

Naturally, the single set of coupling heads 2A in FIG. 6 could also be replaced by two staggered rows, as shown in FIGS. 3 – 5, if it is desired to provide greater security against unintentional separation of the fastener halves by a relative movement perpendicular to the plane of the fastener.

I claim:

1. A coupling element for a slide fastener, comprising an elongate seamless body of thermoplastic material with a throughgoing channel bounded by a wall which defines a longitudinal edge of said body, said wall being provided with hollow deformations of undercut profile whose interior is open toward said channel and which form heads longitudinally spaced along said edge for mating engagement with complementary deformations on a similar coupling element juxtaposed therewith.

2. A coupling element as defined in claim 1 wherein said body has a substantially solid portion paralleling said longitudinal edge.

3. A coupling element as defined in claim 2 wherein said substantially solid portion is of bifurcate cross-section forming a pair of generally parallel flanges.

4. A coupling element as defined in claim 2 wherein said substantially solid portion is a flattened tube.

* * * * *